Oct. 11, 1955
A. W. GUSTAFSON
2,720,340
FERTILIZER DISTRIBUTOR
Filed Jan. 22, 1953
3 Sheets-Sheet 2
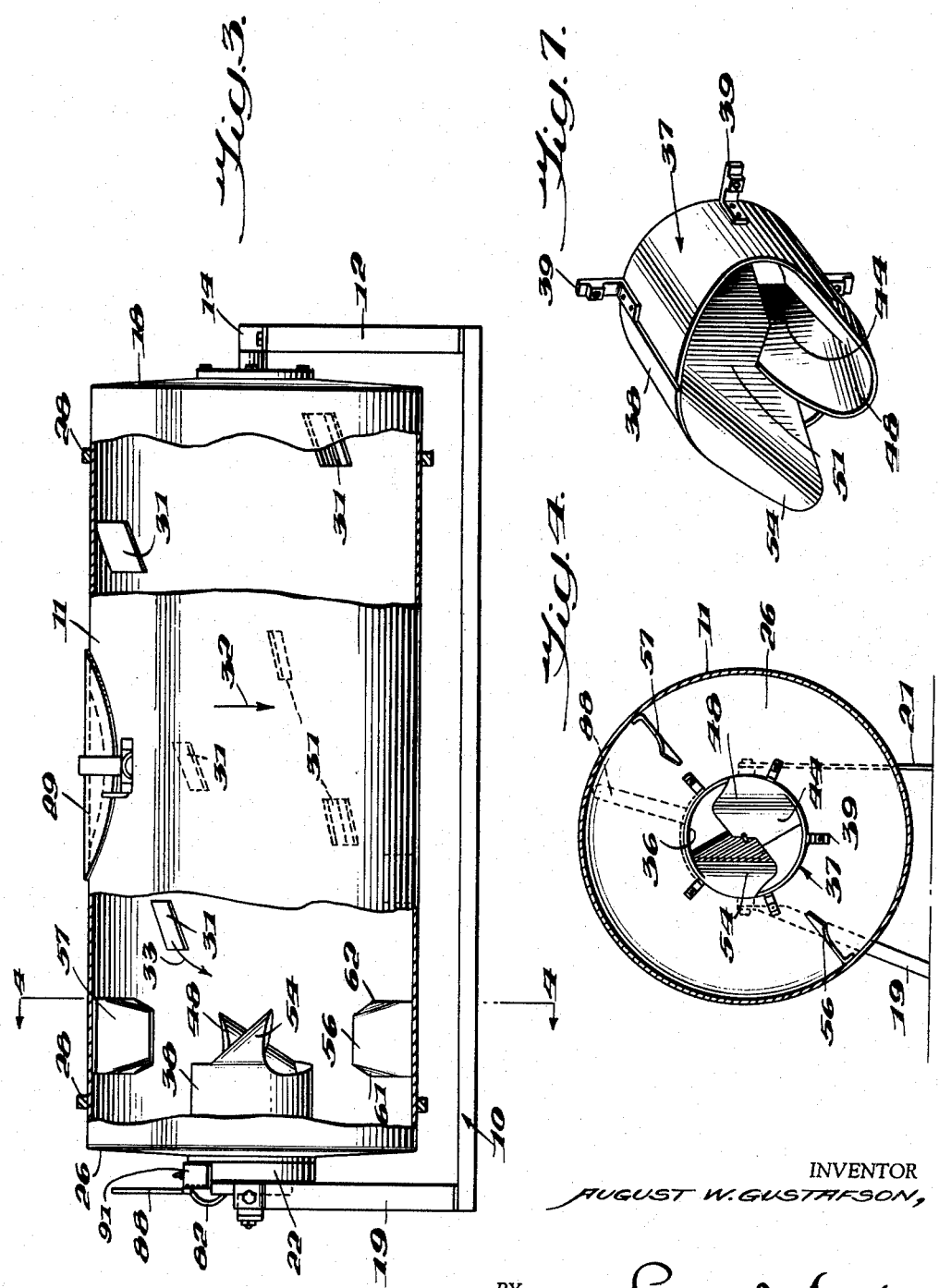
INVENTOR
AUGUST W. GUSTAFSON,
BY
ATTORNEY

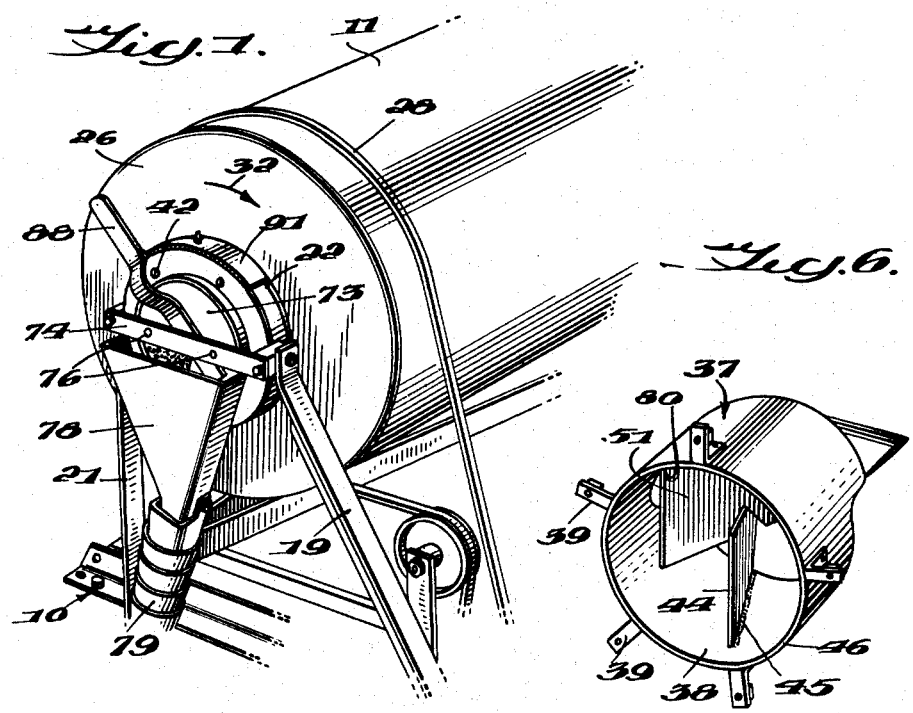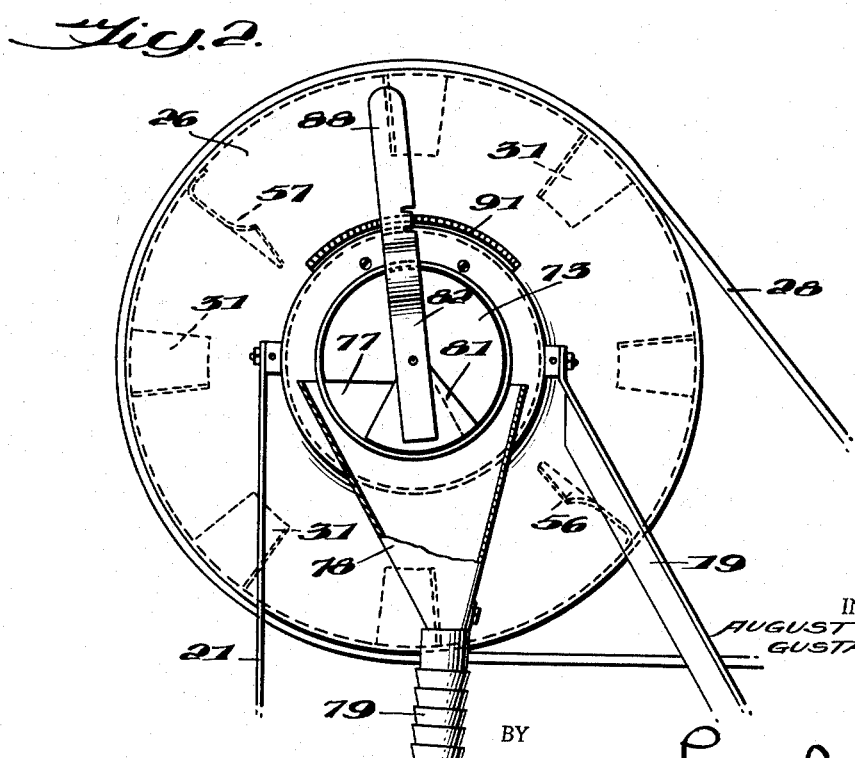

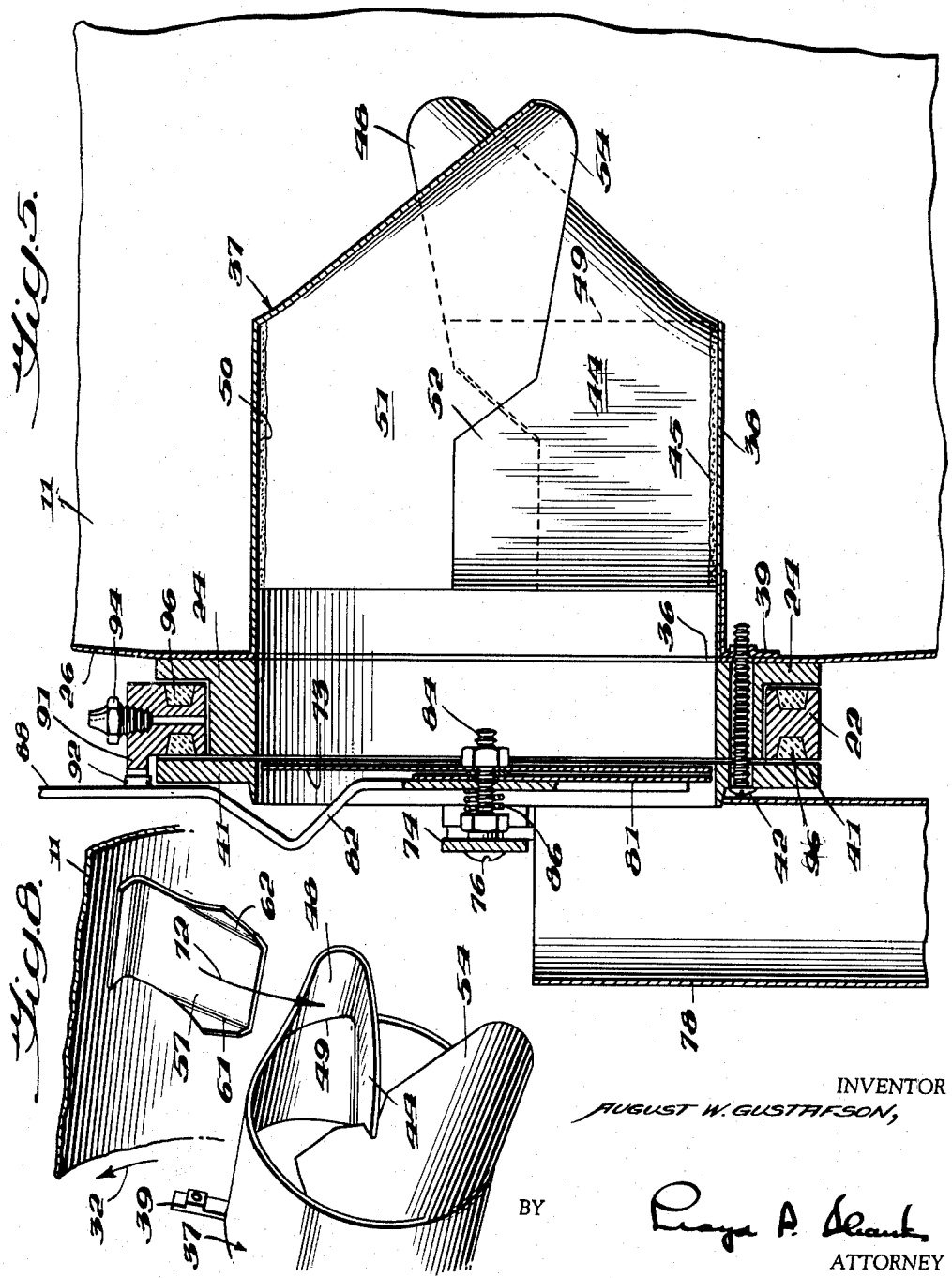

United States Patent Office 2,720,340
Patented Oct. 11, 1955

2,720,340

FERTILIZER DISTRIBUTOR

August W. Gustafson, Corpus Christi, Tex.

Application January 22, 1953, Serial No. 332,699

8 Claims. (Cl. 222—167)

The present invention relates to apparatus for distributing fertilizer or the like and more specifically pertains to a drum in which the pulverulent material to be distributed is kept under agitation so that the material is aerated to avoid packing of the particles whereby the material is delivered from the drum at a substantially constant rate.

An object of the invention is to provide a distributor for a fertilizer or seed wherein the quantity of material within the storage hopper will not alter the rate of discharge which remains unchanged by the head of the pulverulent material above the discharge outlet.

A further object of the invention is to provide a distributor mechanism devoid of parts which rotate with respect to other parts so that life of the elements is prolonged and operation of the apparatus is unchanged by corrosion and provides for uniform discharge of the material from the mechanism even though the fertilizer or similar materials may absorb a relatively large amount of moisture and thus tending to be difficult to move at a uniform rate through the discharge outlet.

Other objects and features of the invention will be appreciated and recognized as the present disclosure proceeds and upon consideration of the accompanying drawings and the following detailed description wherein an embodiment of the invention is disclosed.

In the drawings:

Fig. 1 is a fragmentary perspective view of apparatus exhibiting the invention.

Fig. 2 is an end view of the distributing mechanism with parts shown in section.

Fig. 3 is a side elevational view of the apparatus with portions of the drum broken away to illustrate elements within the drum.

Fig. 4 is a sectional view taken on the line 4—4 of Fig. 3.

Fig. 5 is an enlarged sectional view of the end portion of the drum showing details of the discharge elements.

Fig. 6 is a perspective view of a cup and vane device for conducting the pulverulent material through an end of the drum.

Fig. 7 is a perspective view of the cup and vane device showing the receiving end of the device.

Fig. 8 is a fragmentary perspective view illustrating the manner in which the pulverulent material is delivered into the cup and vane device.

The apparatus is so designed as to be mounted on various types of agricultural implements such as cultivators or the like. Thus when the mechanism is employed for distributing fertilizer the pulverulent or granular material may be delivered into furrows created by the cultivator. In the embodiment shown in the drawings a frame 10 is provided for supporting the distributing apparatus and the frame is adapted to be mounted on a tractor drawn cultivator or other equipment used for agricultural purposes. The frame may also be attached to the tractor proper. A drum 11 is supported by the frame 10 for rotation with respect thereto. A plurality of frame members one of which is shown at 12 in Fig. 3 extend upwardly from the base portion of the frame. These upright members support a bearing 14 in which a trunnion carried by the end 18 of the drum is journalled. Two frame members 19 and 21 are supported by the opposite end of the base frame and provide support for the other end of the drum for rotation about its axis. A relatively large bearing ring 22 is supported by the frame members 19 and 21 so that the bearing ring 22 remains in a stationary fixed position relative to the frame. An annular member 24 L-shaped in cross section as shown in Fig. 5 is attached to the end 26 of the drum 11 and rotates within the bearing ring 22. The annular member 24 is of such diameter as to fit within the bearing ring 22 and serve to support the end 26 of the drum for rotation in the bearing ring 22.

The drum may be rotated in any suitable manner such as by means of one or more belts 28 trained about the periphery of the drum 11. The belts 28 may be driven in any suitable manner such as a power take-off (not shown) from the tractor. An opening is provided in the periphery of the drum 11 through which the fertilizer or similar material may be supplied into the drum 11. The fill opening is closed by means of a door or lid 29.

A plurality of blades 31 are mounted on the interior of the drum 11 and carried by the inner surface of the cylindrical wall. These blades 31 may be formed of sheet-material and may be welded or otherwise attached to the periphery of the drum. The blades 31 each have a portion which extends radially inward from the periphery and such parts of the blades are all arranged at an angle to planes through the diameter of the drum. The inner effective portion of each blade 31 may be considered as being in an askew position with respect to the axis of the drum 11. The drum 11 rotates in the direction of the arrow 32 in Fig. 3. Thus the pulverized material within the drum 11 is moved axially of the drum as the blades 31 pass through the lowermost arc of one rotation of the drum. The angular disposition of the blades 31 is such that soon after a blade 31 merges from the body of material the pulverulent carried on the forward face of the blade 31 spills from the edge thereof as shown by the arrow 33 in Fig. 3. Thus the material is moved axially towards the discharge end 26 of the drum. The fertilizer or pulverulent material is also constantly agitated by the blades 31 and is lifted and falls downward in the drum while being shifted axially towards the discharge end. Thus the pulverulent material is aerated to break up any lumps or the formation of clusters of particles which may tend to adhere to each other.

The discharge end 26 is provided with a relatively large discharge opening 36. A cup and vane device shown generally at 37 is secured to the end wall 26 of the drum adjacent the discharge opening 36. The device 37 includes a cylindrical portion 38 which has a diameter substantially equal to the discharge opening 36. The cylindrical portion 38 carries a plurality of brackets 39 having threaded openings therein. Portions of the brackets 39 lie along the inner surface of the end wall 26 and one is shown in proper position in Fig. 5. The bearing structure at the discharge end of the drum 11 is completed by a ring-shaped flange 41 which serves to hold the annular member 24 in operative association with the bearing ring 22. A plurality of cap screws 42 extend through the flange 41 and through the member 24 and through the threaded openings in the brackets 39 of the device 37. The flange 41 is thereby secured to annular member 24 of the bearing structure and this assembly plus the cup and vane device 37 are thus secured to the drum 11 so as to rotate therewith.

The cup and vane device 37 includes uniquely shaped vanes which terminate at their inner ends in two cup-like extensions 48 and 54. One vane 44 extends from the discharge end 46 of the device 37 in a substantially straight direction but at an angle to the axis of the drum and askew with regard to the axis of the cylindrical portion 38. The vane 44 beyond the inner end of the cylindrical wall 38 curves to form the cup-like extension 48. The sheet material forming the vane 44 is secured to the end of the cylindrical wall 38 along the dotted line 49 in Fig. 5. The peripheral edge 45 of the vane 44 is welded to the inner surface of the cylindrical portion 38.

Another vane 51 extends from a position near the discharge end 46 of the device 37 in a substantially straight plane which is disposed in an askew manner with respect to the axis of the device. The vanes 44 and 51 each have triangular V-shaped notches therein so that they overlap each other at 52. The vane 51 extends beyond the inner end of the cylindrical portion 38 and is bent to provide the cup shaped extension 54 which has its open portion disposed in a direction opposite to that of the cup 48. The end of the vane 51 after being bent to form the cup extension 54 is welded or otherwise attached to the inner end of the cylindrical portion 38. The peripheral edge 50 of the vane 51 is secured to the inner surface of the cylindrical wall 38.

The pulverulent material as herein above described is moved towards the end 26 of the drum as a result of the axial displacement brought about by the action of the blades 31. The drum 11 in the embodiment illustrated carries two scoops 56 and 57 on the inner periphery thereof near the discharge end of the drum. These scoops are formed of sheet material and are not angularly disposed like the blades 31. The scoops 56 and 57 in the portions extending radially inwardly from the drum wall lie substantially in one plane through the diameter of the drum. The inner ends of the scoops 56 and 57 are provided with side walls 61 and 62 of limited length. The drum 11 during rotation carries the scoops 56 and 57 with it and in the direction of the arrow 32 in Fig. 8. The pulverized material is engaged by each scoop as it passes through a lowermost arc in its annular path of movement and a quantity of the material is carried forward and moved upwardly with each scoop. When one scoop, such as 57 in Fig. 8, arrives at an elevated position and above the device 37, the pulverized material leaves the scoop in the direction of the arrows 72. The scoop 57 is so positioned on the cylindrical wall of the drum 11 with respect to the cup-shaped extensions 48 that the material discharged therefrom drops into this cup extension. The discharge device 37 rotates in the same direction as the drum and as the material dropped in the cup extension 48 is carried further upwardly in the device 37 it then slides downwardly along the inclined portion of the vane 44 and escapes through the discharge opening 36 in the end of the drum. The scoop member 56 functions in a similar manner to move, lift and drop a batch of the pulverized material into the cup extension 54. As the distributor rotates the material in the cup extension 54 moves along the inclined vane 51 and is discharged through the outlet opening 36.

The apparatus includes means for controlling the rate of discharge of the fertilizer or other material from the drum. A disc-shaped plate member 73 is supported within the ring-shaped flange 41 by means of a bar 74 and a plurality of bolts 76 which hold the disc 73 in a fixed stationary position. The ends of the bar 74 are secured to the stationary portion of the bearing structure as shown in Fig. 1. The disc 73 is provided with an opening 77 (Fig. 2) of sector shape. The pulverulent material delivered through the outlet opening 36 of the drum escapes through the opening 77 and drops into a funnel-shaped member 78. The material is guided downwardly from the discharge end of the funnel member 78 by means of a flexible tube 79. The area of the opening 77 may be adjusted by means of a sector-shaped plate 81 secured to a lever 82. The plate 81 and the lever 82 are pivotable about the axis of a bolt 84. The plate 81 is held in face-to-face engagement with the disc 73 by means of a spring 86. The lever 82 terminates in a handle 88. An arcuate shaped projection 91 having notches in the edge thereof is carried by the stationary bearing ring 22. A detent 92 on the handle 88 is resiliently urged into the notches of the projection 91 to hold the lever and the sector-shaped plate 81 in adjusted positions to thereby control the effective size of the discharge opening 77.

The bearing structure is adapted to be lubricated by means of a grease fitting 94 as shown in Fig. 5. The lubricant is retained in the bearing structure by means of packing rings 96. The packing rings also serve to prevent foreign matter from entering into spaces between the relative moving parts of the bearing structure.

In operation, the pulverulent material is supplied into the drum 11 through the fill opening so that the level of the material in the drum is below the axis. The cover 29 is then closed. The drum is rotated in the direction of the arrows 32 and the blades 31 each engage a segment of the material in passing through the lowermost arcs of their paths of movement. While each blade 31 remains below the surface of the pulverized material the particles in front of the blade 31 are shifted axially. As each blade emerges from the material and moves upwardly, the particles remaining on the blade 31 are dropped therefrom in the direction of the arrow 33 in Fig. 3. The pulverulent material is thereby moved axially towards the discharge end of the drum and to facilitate its handling during discharge from the drum.

The scoop members 56 and 57 move with the drum 11 and follow an annular path about the axis of the drum. Each scoop in its lowermost arc of movement engages the pulverulent material disposed in frnt of it and moves it forwardly. As the blade moves above the level of the pulverulent material a batch is carried upwardly by the scoop. As the upward movement continues, the pulverulent material escapes downwardly over the innermost end of the scoop after its angle of repose has been exceeded. The material carried by the scoop 57 drops in an arcuate path somewhat as represented by the arrow 72 in Fig. 8 and into the cup-like extension 48. The scoop 56 functions in a similar manner to drop its load of pulverulent material into the cup-like extension 54.

The vane and cup device 37 turns with the drum 11 and at the same speed and in step with the scoops 56 and 57. The material deposited in the cup 48 moves with the device 37 in the direction of the arrow 32 and slides downwardly along the angularly disposed straight portion of the vane 44 and escapes through the discharge opening 36 in the end 26 of the drum. The pulverulent material deposited in the cup 54 slides along the angularly disposed portion of the vane 51 and as the device 37 rotates, it escapes through the discharge opening 36. While the apparatus includes a number of elements which move with the rotating drum, there is no movement of one part with respect to another element so that corrosion of the different elements will not alter the handling and discharge of the material. The amount of material within the drum 11 in no way affects the discharge rate since the head of the material does not alter the function of the discharge elements.

While the invention has been described with reference to specific structural features and with regard to one embodiment, it will be appreciated that changes may be made in the shape and disposition of the elements as well as in the general organization. Such alterations and others may be made without departing from the spirit and scope of the invention as set forth in the appended claims.

What I claim and desire to secure by Letters Patent is:

1. In apparatus for discharging pulverulent material, a cylindrical shaped drum having a discharge opening in an end wall adjacent the axis of the drum, means supporting said drum for rotation about a substantially horizontal axis, means within the drum for moving the pulverulent material axially therein toward said end wall, a scoop carried by the cylindrical wall of said drum adjacent said end wall for engaging and lifting a quantity of the pulverulent material as the drum rotates, a cylindrical shaped shell registering with said discharge opening rotatable with the drum, a cup carried by said shell beyond an inner end thereof for receiving the material dropped from said scoop, and an angularly disposed vane within and carried by said shell receiving pulverulent material from said cup for shifting the material through said discharge opening upon further rotation of the drum.

2. In apparatus for discharging granular material, a drum supported for rotation about its axis, an end wall for the drum having a discharge opening therein adjacent the axis of the drum, a scoop carried by said drum near said end wall for engaging and lifting a quantity of the material as the drum rotates, a cup device adjacent said discharge opening rotatable with the drum for receiving material dropped from said scoop, an angularly disposed vane carried within said device for shifting the material from the cup through said discharge outlets as the drum rotates, and adjustable means for altering the area of said discharge opening.

3. In apparatus for discharging finely divided solid material, a cylindrical-shaped drum supported for rotation about its axis, an end wall on the drum having a discharge opening therein concentric with the axis of the drum, a generally cylindrical-shaped member within the drum surrounding said discharge opening, a vane within and carried by said member extending in an askew manner with respect to the axis thereof and terminating in a cup beyond an inner end of the cylindrical-shaped member, a scoop carried by the cylindrical wall of the drum for engaging and lifting a quantity of the material therein as the drum rotates, and said scoop being so positioned in relation to the cup that the material carried thereon will drop into the cup when the angle of repose of the material is exceeded.

4. In apparatus for discharging a finely divided solid material, a cylindrical-shaped drum supported for rotation about its axis, an end wall on the drum having a discharge opening concentric with the axis of the drum, a cylindrical shell attached to said end wall having a diameter substantially equal to said discharge opening and registering therewith, a vane within said shell sloping rearwardly with respect to the direction of rotation of the drum in proceeding inwardly from the discharge end, a cup at the inner end of said vane, a scoop carried by the cylindrical wall of the drum for engaging and lifting a quantity of the material as the drum rotates, said scoop being positioned to drop material carried thereon into said cup, a disc having a sector-shaped outlet opening therein closing said discharge opening, and means for adjusting the effective area of said outlet opening.

5. In apparatus for discharging granular particles, a cylindrical-shaped drum supported for rotation about its axis, an end wall on the drum having a discharge opening concentric with the axis of the drum, a cylindrical shell attached to said end wall extending into the drum around said discharge opening, a vane attached to an inner surface of said cylindrical shell having a forward surface sloping toward said discharge opening, a cup at the inner end of said vane, a scoop carried by the cylindrical wall of the drum for engaging and lifting a quantity of particles as the drum rotates, said scoop being so positioned that the particles carried thereon drop into the cup when thte angle of repose of the particles is exceeded as the drum rotates, and means for adjusting the effective area of the discharge opening.

6. A cup and vane structure for moving finely divided solid material through a discharge outlet comprising, a cylindrical shell, a vane within the cylindrical shell secured at its outer edge to the shell, said vane extending in an askew direction with respect to the axis of said shell, a cup at the inner end of the shell merging with an inner end of said vane, another vane within said cylindrical shell secured at its outer edge to the shell, said second vane extending in an opposite askew direction with respect to the axis of the shell and crossing the first vane, and a cup at the inner end of the shell merging with an inner end of the second vane.

7. A cup and vane structure for conveying finely divided solid material through a discharge opening comprising, a cylindrical shell, a vane within the cylindrical shell secured at its outer edge to the said shell and extending in an askew direction with respect to the axis thereof, said vane extending beyond an inner end of the shell and terminating in a cup, another vane within said cylindrical shell secured at its outer edge to the shell and extending in an opposite askew direction with respect to the axis of the shell and crossing the first vane, and said second vane extending beyond the inner end of the shell and terminating in a cup.

8. In apparatus for discharging pulverulent fertilizer, a drum supported for rotation about a substantially horizontal axis, an end wall for said drum having a discharge opening therethrough adjacent the axis of the drum, a shell shaped member within the drum registering with said discharge opening, and rotating with the drum, a vane within said member having a forward face sloping rearwardly with respect to the direction of rotation of the drum in proceeding inwardly from said end wall, a cup carried by an inner portion of said member having a surface merging with the forward face of said vane, means carried by the drum for engaging and lifting a quantity of fertilizer as the drum rotates, and said means being positioned to drop the fertilizer carried thereon into said cup.

References Cited in the file of this patent

UNITED STATES PATENTS

| | | |
|---|---|---|
| 684,209 | Everhart | Oct. 18, 1901 |
| 939,044 | Lindhard | Nov. 2, 1909 |
| 1,527,128 | Durouaux et al. | Feb. 17, 1925 |
| 1,655,753 | Cole | Jan. 10, 1928 |
| 1,875,450 | Harper | Sept. 6, 1932 |
| 2,283,805 | Gustafson | May 19, 1942 |
| 2,436,959 | Ekin et al. | Mar. 2, 1948 |